United States Patent [19]
Haneda

[11] Patent Number: 5,394,839
[45] Date of Patent: Mar. 7, 1995

[54] INTERNAL COMBUSTION ENGINE

[76] Inventor: Yuji Haneda, 636-3, Shizunami, Haibara-cho, Haibara-gun, Shizuoka, 421-04, Japan

[21] Appl. No.: 203,195

[22] Filed: Feb. 28, 1994

[30] Foreign Application Priority Data

Apr. 23, 1993 [JP] Japan .................................. 5-098151

[51] Int. Cl.⁶ ............................................. F02B 75/32
[52] U.S. Cl. .................................. 123/53.1; 123/197.4
[58] Field of Search .............................. 123/197.4, 53.1

[56] References Cited

U.S. PATENT DOCUMENTS

| | | | |
|---|---|---|---|
| 3,686,972 | 8/1972 | McWhorter | 123/197.4 |
| 3,693,464 | 9/1972 | Wieckmann | 123/197.4 |
| 4,026,252 | 5/1977 | Wrin | 123/197.4 |
| 4,887,560 | 12/1989 | Heniges | 123/197.4 |
| 4,966,043 | 10/1990 | Frey | 123/197.4 |
| 5,040,502 | 8/1991 | Lassiter | 123/197.4 |
| 5,067,456 | 11/1991 | Beachley et al. | 123/197.4 |
| 5,076,220 | 12/1991 | Evans et al. | 123/53.1 |
| 5,158,047 | 10/1992 | Schaal et al. | 123/197.4 |

Primary Examiner—David A. Okonsky
Attorney, Agent, or Firm—Kanesaka & Takeuchi

[57] ABSTRACT

An internal combustion engine in which a circular housing is journaled to an end of a connecting rod remote from a piston at an eccentricity, and a rotary member is rotatably received in the circular housing, with an output shaft connected to the outer surface of the rotary member at an eccentricity. An internal ring gear provided in the circular housing meshes with a pinion gear fixed around a bearing. With this arrangement, it is possible to efficiently convert the explosion pressure in the combustion chamber into output torque on the output shaft, thus increasing the output torque of the engine while reducing fuel consumption. At the same time, the engine output power is stabilized in the low-speed region of engine operation. Consequently, the explosion pressure in the combustion chamber is efficiently converted into output power of the engine output shaft, thus achieving high efficiency and large output power of the engine.

5 Claims, 7 Drawing Sheets

INTERNAL COMBUSTION ENGINE

BACKGROUND OF THE INVENTION

The present invention relates to an internal combustion engine such as a reciprocating internal combustion engine which operates at an improved rotation efficiency.

DESCRIPTION OF THE RELATED ART

In general, in a reciprocating internal combustion engine, air-fuel mixture introduced into a cylinder is compressed to a high pressure by upward stroking of the engine and is ignited when the piston has reached a position near the top dead center. As a result, combustion or explosion takes place to press down the piston thereby giving a large torque to the output shaft.

More specifically, referring to FIG. 8, the crank 31 also is at its top dead center when the piston 30 is at the top dead center in its stroke, so that the connecting rod 32 which interconnects the piston 30 and the crank 31 extends on a common axis line x with the piston 30.

Therefore, when the piston is at the top dead center, the force produced by the explosion pressure generated in the combustion chamber acts downward right on the crankshaft 33, with the result that part of the force is lost without being transmitted to the output shaft.

This means that the required torque can never be obtained unless the engine speed is raised to a certain level, which uneconomically increases fuel consumption.

SUMMARY OF THE INVENTION

Accordingly, an object of the present invention is to overcome the above-described problem of the known art by providing an internal combustion engine which can efficiently transmitting the force generated by the explosion pressure in the combustion chamber to the engine output shaft, thus realizing high efficiency and large output power of the internal combustion engine.

According to the present invention, this object is achieved by an internal combustion engine in which a circular housing is journaled to an end of a connecting rod remote from a piston at an eccentricity, and a rotary member is rotatably received in the circular housing, with an output shaft connected to the outer surface of the rotary member at an eccentricity. An internal ring gear provided in the circular housing meshes with a pinion gear fixed around a bearing. With this arrangement, it is possible to efficiently convert the explosion pressure in the combustion chamber into output torque on the output shaft, thus realizing high efficiency and large output power of the engine.

The invention having the described feature offers the following advantage. When the piston is at the top dead center in its stroke, the journal portion on the other end of the connecting rod, at which the circular housing is journaled to the connecting rod, is positioned ahead of the top dead center of rotation of the circular housing as viewed in the direction of rotation, so that the explosion force acting on the top surface of the piston is efficiently converted into the torque of the output shaft. It is therefore possible to increase the output torque of the engine and to reduce fuel consumption, while stabilizing the engine output characteristic at low-speed range of the engine operation.

DESCRIPTION OF THE PREFERRED EMBODIMENTS

Figure 1:
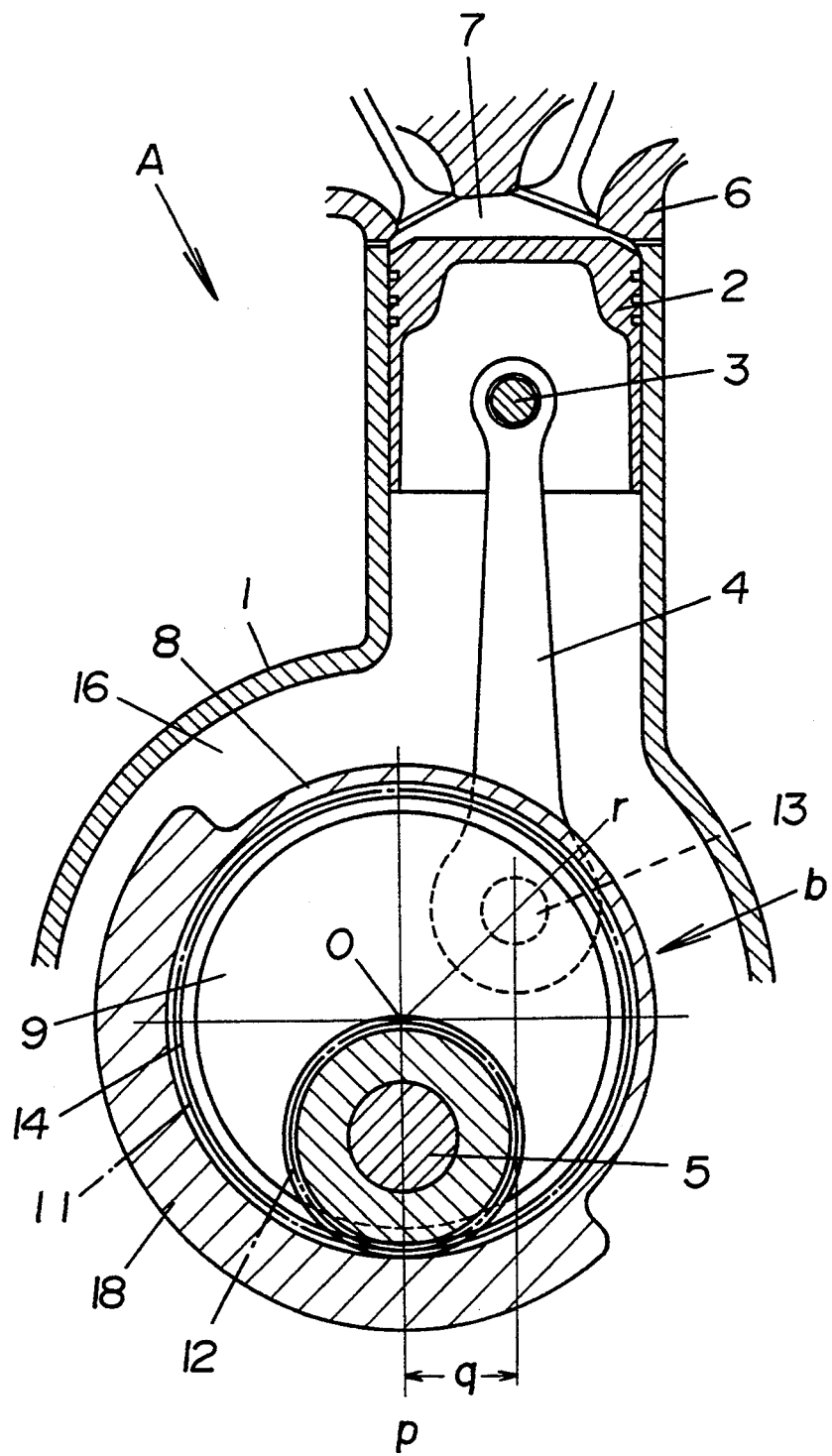
FIG. 1 is a sectional front elevational view of n internal combustion engine as an embodiment of the present invention.

According to the present invention, there is provided an internal combustion engine, comprising: a cylinder; a crank chamber disposed in the cylinder; a piston which reciprocatingly move in the cylinder; a connecting rod having one end connected to the piston; and crank means connected to the other end of the connecting rod and producing a torque applied to an engine output shaft; wherein the crank means includes: a circular housing journaled to the other end of the connecting rod at an eccentricity; a disk-shaped rotary member rotatably received in the circular housing; an output shaft rotatably carried by a bearing provided in the crank chamber and fixed to the outer surface of the rotary member at an eccentricity; an internal ring gear provide on the circular housing; and a pinion gear fixed to the bearing concentrically with the output shaft in meshing engagement with the internal ring gear; and wherein the journal portion on the other end of the connecting rod at which the circular housing is journaled to the connecting rod is so mounted that it is positioned ahead of the top dead center of the circular housing as viewed in the direction of rotation of the circular housing, when the piston is positioned at the top dead center.

In operation of the engine of the invention having the described construction, when the air-fuel mixture is introduced into the combustion chamber in a cylinder, the piston is in its downward stroke and, after passing the bottom dead center, commenced its upward stroking to compress the air-fuel mixture. When the piston has reached a position near the top dead center, the air-fuel mixture is ignited to explode, thus applying a pressure to the top surface of the piston to press the piston downward, thus generating an output torque through the action of the connecting rod.

More specifically, the force generated by the explosion pressure is transmitted through the connecting rod from the piston to a journal portion on the end of the connecting rode remote from the piston, so as to cause the circular housing to rotate. According to the invention, the journal portion on the connecting rod end remote from the piston is so positioned that it is ahead of the top dead center when the piston is at the top dead center, so that the force transmitted through the connecting rod be transmitted to the circular housings with a high degree of efficiency. The rotary members are slidably received in the circular housings and connected to output shafts at an eccentricity. Therefore, the rotation of the circular housings tends to cause the rotary members to revolve about the output shafts eccentrically connected thereto, while sliding on the inner surfaces of the circular housings. Actually, however, the ring gear teeth internally formed on the circular housings mesh with the pinion gear teeth formed on the bearings fixed in the crank chamber, so that the rotation of the circular housings appear as revolution of these circular housings along the pinion gear teeth on the bearing, causing rotation of the output shafts.

An internal combustion engine a an embodiment of the present invention will be described with reference to the accompanying drawings.

Figure 2:
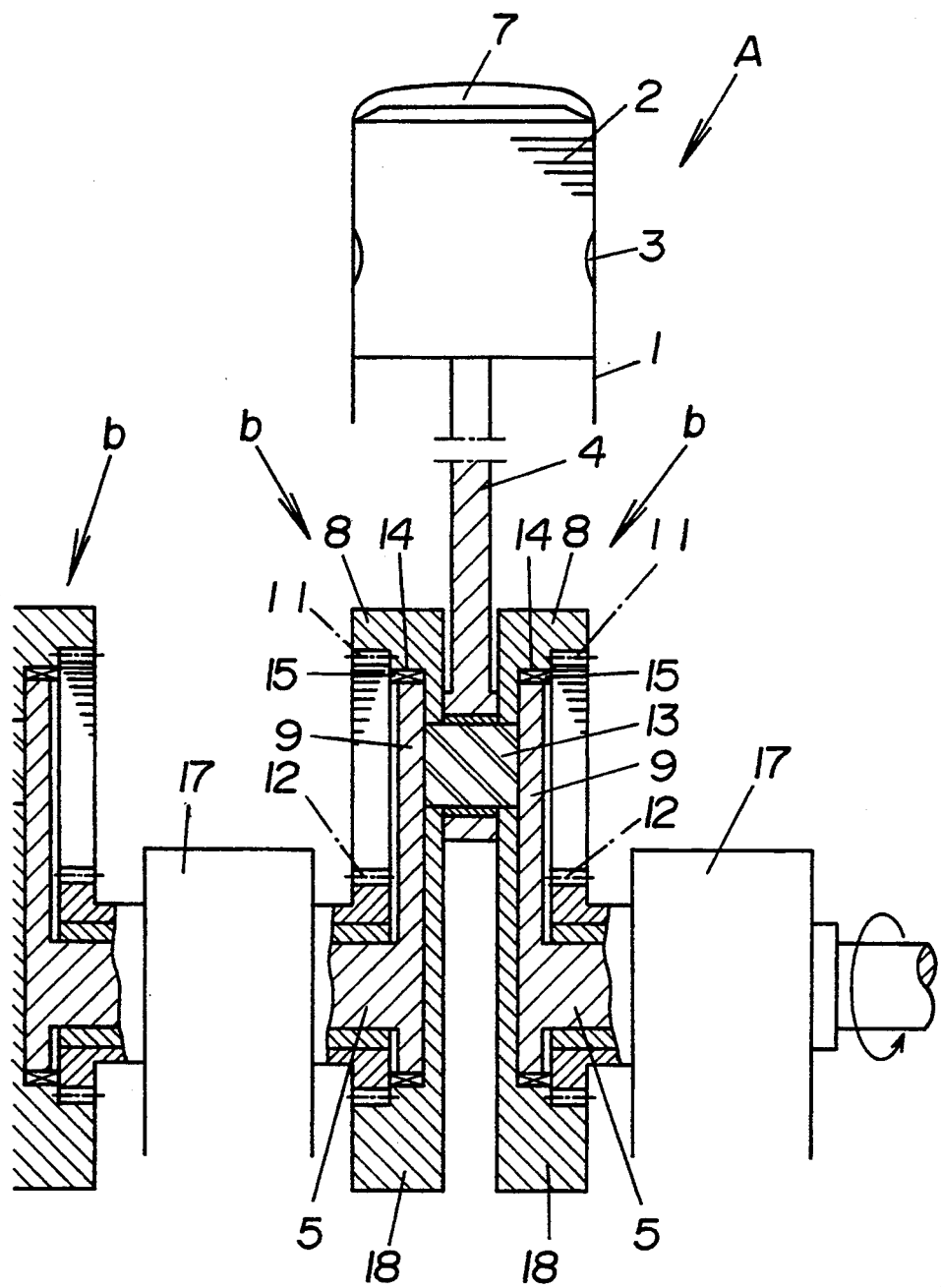
FIG. 2 is a sectional side elevational view of the engine shown in FIG. 1.
Figure 3:
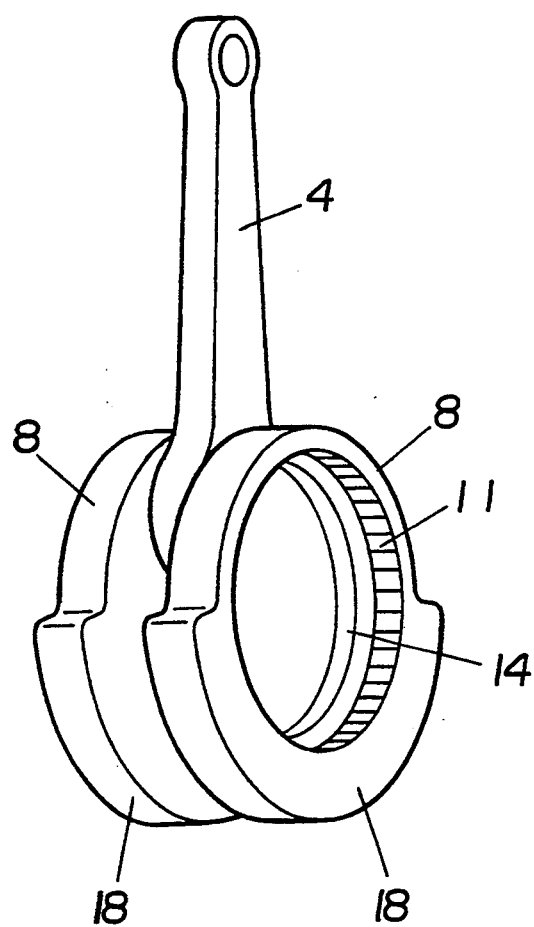
FIG. 3 is a perspective view of circular housings journaled to a connecting rod.
Figure 4:
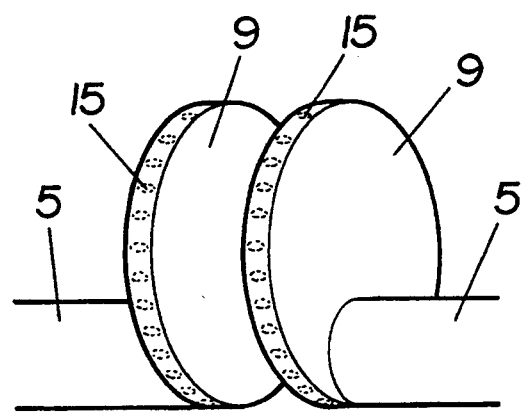
FIG. 4 is a perspective view of a critical portion of the engine shown in FIG. 1, illustrating particularly a manner in which output shafts are connected to rotary members.
Figure 5:
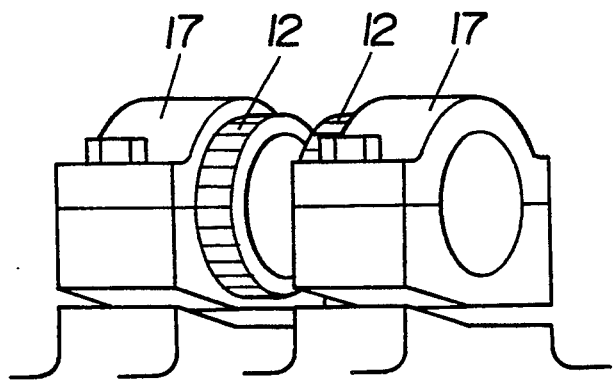
FIG. 5 is a perspective view of a bearing to which a pinion gear is attached.

Referring to FIGS. 1 and 2, a reciprocating internal combustion engine A has a cylinder 1, a piston 2 reciprocatably received in the cylinder 1, a piston pin 3 on the piston 2, a connecting rod 4 connected at its one end to the piston 2 through the piston pin 3, output shafts 5 and a crank means "b" which is connected to the other end of the connecting rod 4 and capable of transmitting the force from the connecting rod 4 to the output shafts 5 to cause rotation of the output shafts 5.

This engine has a basic construction similar to that of ordinary engine, with a combustion chamber 7 defined by the piston 2, cylinder 1 and a cylinder head 6 on the cylinder 1.

The novel feature of the internal combustion engine A resides in the construction of the crank means "b". More specifically, the crank means "b" includes circular housings 8, rotary members 9, output shafts 5, ring gears 11 and pinion gears 12.

The circular housings are cylindrical members which are eccentrically connected to the other end, i.e., the end remote from the piston, of the connecting rod 4 by means of a journal portion 13, in a manner similar to crank arms of conventional engines.

The rotary members 9 are disk-shaped members concentrically received in the circular housings 8, more particularly in annular recesses 14 in the circular housings 8 rotatably through thrust bearing 15. The output shafts 5 are rotatably supported by bearings 17 in a crank chamber 16 integral with the cylinder 1, and are connected to the outer surfaces of the rotary members 9 at an eccentricity from the centers of the rotary members.

Thus, the circular housing 8 are connected to the output shafts 5 rotatably supported by the bearings 17, for rotation relative to the output shafts 5 by virtue of the rotatable fitting engagement between the rotary members 9 and the annular recesses 14 in the circular housings 8.

As shown in FIG. 1, the arrangement is such that, when the piston 2 is at the top dead center of its stroke, the connecting rod 4 is held upright such that its axis extends vertically, with the journal portion 13 positioned at an offset "q" from the vertical line "p" passing through the centers of the circular housings 8.

The amount "q" of the offset is determined by the angle of the mounting line "r" interconnecting the center "O" of the circular housings 8 and the center of the journal portion 13 of the connecting rod 4. This angle is not smaller than 45° but less than 90° preferably between 50° and 75°.

Figure 6:
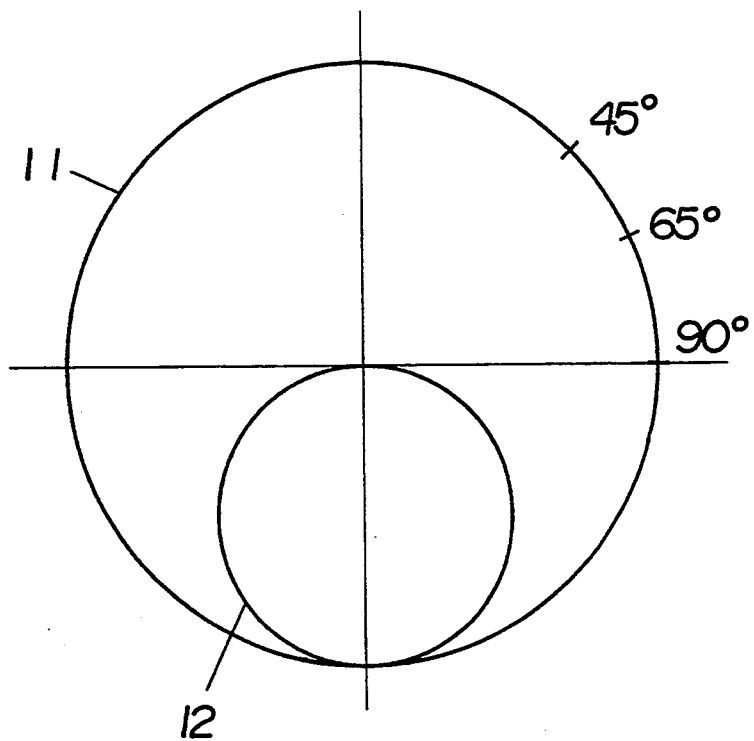
FIG. 6 is an illustration of the condition of mounting of the connecting rod.

The setting of the above-mentioned angle is conducted when the pinion gears 12 and the associated ring gears 11 engage with each other at their lowermost portions as shown in FIG. 6.

Figure 7:
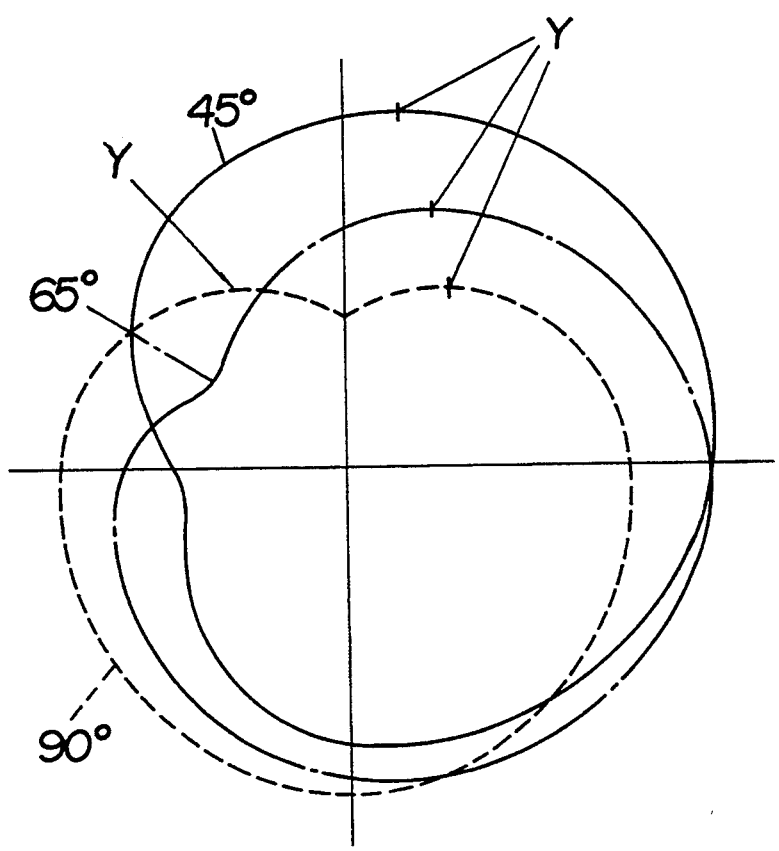
FIG. 7 is an illustration of loci of rotation with diffeent conditions of mounting of the connecting rod.
Figure 8:
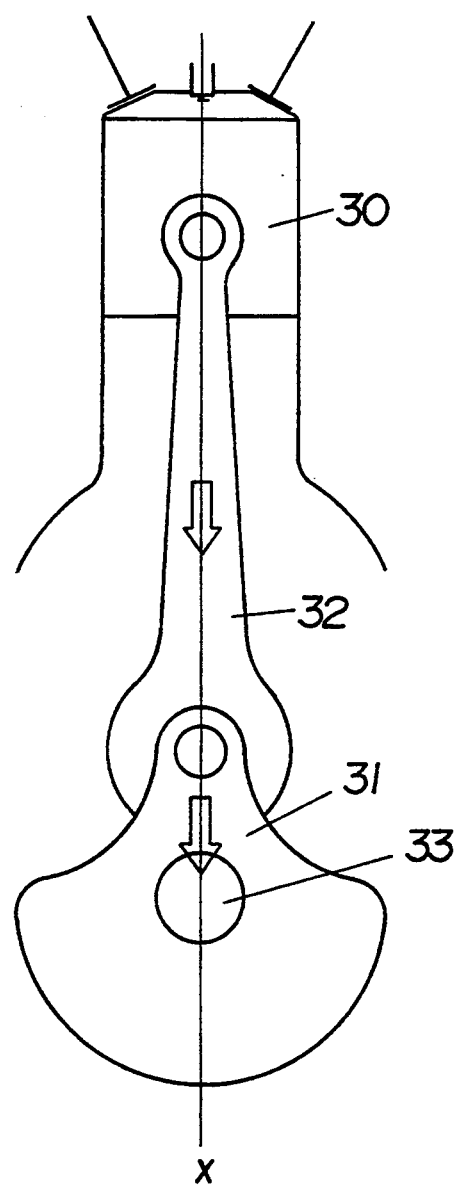
FIG. 8 is a schematic illustration of the internal combustion engine shown in FIG. 8.

In FIG. 7, a solid line shows the locus of revolution of the journal portion 13 on the connecting rod 4 as obtained when the above-mentioned angle is set to 45°. In this case, the piston 2 reaches its top dead center when the journal portion 13 has been revolved to a position which is about 10° ahead of the top dead center Y of the crank-like circular housings 8. Therefore, the journal portion 13 of the connecting rod 4 is positioned near the vertical line "p" passing the centers of the circular housings 8. Therefore, the explosion pressure acting on the top surface of the piston 2 cannot efficiently be converted into the output torque of the engine.

Chain line in FIG. 7 shows the locus of revolution of the journal portion 13 of the connecting rod as obtained when the above-mentioned angle "r" is set to 65°. In this case, the position Y of the journal portion 13 when the piston 2 is at the top dead center is sufficiently spaced from the top dead center of the circular housings, so that the combustion pressure acting downward on the top surface of the piston 2 is efficiently converted into effective engine output torque, although the revolution is rather unsmooth.

Broken-line in FIG. 7 shows the locus of revolution of the journal portion 13 of the connecting rod 4 as observed when the above-mentioned angle "r" is set to 90°. In this case, the locus is substantially heart-shaped symmetrical with respect to the vertical line "p" passing the centers of the circular housings 8. In this case, there are two positions Y of the journal portion 13 corresponding to the top dead center of the piston 2 in a single stroke This value of the angle "r", therefore, cannot be adopted.

The aforementioned ring gear 11 is integrally formed in each circular housing 8. The gear teeth of each ring gear 11 mesh with the teeth of the stationary pinion gear 12 fixed on the bearing 17, so that the ring gear 11 revolves about the axis of the pinion gear 12. The gear ratio, i.e., the number of the teeth of the ring gear 11 to the number of teeth of the pinion gear 11 is set to be 2:1.

In FIG. 1, numeral 18 denotes a balance weight attached to a portion of the periphery of each circular housing 8 so as to smoothen the torque generated by the circular housing 8.

As will be seen from FIG. 2, the crank means "b" is preferably but not exclusively arrange in a pair for each cylinder, i.e., a pair o the crank means "b" are disposed in symmetry at both sides of the connecting rod 4. Obviously, the present invention can be applied to a multi-cylinder engine, with the crank means "b" arranged for each cylinder.

The internal combustion engine A of this embodiment having the described construction operate in the following manner. Air-fuel mixture is introduced into the combustion chamber 7 in the cylinder 1 during downward stroking of the piston 2. The piston 2 after passing the bottom dead center commences its upward stroke to compress the air-fuel mixture. The mixture is then ignited when the piston 2 has reached a point near the top dead center so that the explosion pressure acts on the top surface of the piston 2 to press the piston 2 downward, and the thus produced downward force is converted into torque of the output shaft 5.

More specifically, the explosion pressure generates a force which is transmitted, through the connecting rod 4 connected to the pin 3 on the downwardly moving piston 2, to the journal portion 13 on the other end of the connecting rod 4, thereby causing rotation of the circular housing 8.

When the piston 2 is at the top dead center, the journal portion 13 of the circular housings 8 is positioned at an offset "q" from the vertical line "p" passing the center of the circular housings 8, as will be seen from FIG. 1.

Therefore, when the maximum compression force is applied to the piston 2, the journal portion 13 of the connecting rod 4 is positioned ahead of the above-mention line "p" as viewed in the direction of rotation of the circular housings 8, so that the downward force acting on the piston 2 is efficiently and directly converted into a torque for rotating the circular housings 8.

The rotation of the circular housings 8 cause rotation of the rotary members 9 which are received in the circular housings 8. Since the rotary members are rotatably received in the annular recess 14, the rotation of the circular housings 8 is converted into rotation of the output shafts 5 which are attached to the rotary members 9 at an eccentricity.

On the other hand, since the internal ring gears 11 of the circular housings 8 mesh with the pinion gears 12 fixed to the bearings 17 in the crank chamber 16, so that the rotation of the circular housing 8 causes these housings to revolve about the axis of the pinion gears 12, thus generating the torque for rotating the output shafts 5.

What is claimed is:

1. An internal combustion engine, comprising:
a cylinder;
a crank chamber disposed in said cylinder;
a piston which reciprocatingly moves in said cylinder;
a connecting rod having one end connected to said piston; and
crank means connected to the other end of said connecting rod and producing a torque applied to an engine output shaft;
wherein said crank means includes:
a circular housing journaled to the other end of said connecting rod at an eccentricity;
a disk-shaped rotary member rotatably received in said circular housing;
an output shaft rotatably carried by a bearing provided in said crank chamber and fixed to the outer surface of said rotary member at an eccentricity;
an internal ring gear provided on said circular housing; and
a pinion gear fixed to said bearing concentrically with said output shaft in meshing engagement with said internal ring gear; and wherein
the journal portion on the other end of said connecting rod at which said circular housing is journaled to said connecting rod is so mounted that it is positioned ahead of the top dead center of said circular housing as viewed in the direction of rotation of said circular housing, when said piston is positioned at the top dead center.

2. An internal combustion engine according to claim 1, wherein said disk-shaped rotary member is rotatably received in said circular housing through the intermediary of a thrust bearing which is provided in the outer periphery of said rotary member and which contacts the inner peripheral surface of said circular housing.

3. An internal combustion engine according to claim 1, wherein a pair of said crank means are disposed symmetrically on both sides of said connecting rod.

4. An internal combustion engine according to claim 1, wherein the eccentricity at which said circular housing is journaled to the other end of said connecting rod is so achieved that the angle of a line interconnecting the center of said circular housing and the center of the journal portion of said connecting rod is not less than 45° but smaller than 90°.

5. An internal combustion engine according to claim 1, wherein the eccentricity at which said circular housing is journaled to the other end of said connecting rod is so achieved that the angle of a line interconnecting the center of said circular housing and the center of the journal portion of said connecting rod is not less than 50° but smaller than 75°.

* * * * *